P. V. OHLHEISER.
AUTOMOBILE CHAIN HOOK HOLDER.
APPLICATION FILED SEPT. 18, 1920.

1,366,481.

Patented Jan. 25, 1921.

Paul V. Ohlheiser, Inventor

By Watson E. Coleman
Attorney

UNITED STATES PATENT OFFICE.

PAUL V. OHLHEISER, OF LINCOLN, NEBRASKA.

AUTOMOBILE-CHAIN-HOOK HOLDER.

1,366,481.  Specification of Letters Patent.  Patented Jan. 25, 1921.

Application filed September 18, 1920. Serial No. 411,029.

*To all whom it may concern:*

Be it known that I, PAUL V. OHLHEISER, a citizen of the United States, residing at Lincoln, in the county of Lancaster and State of Nebraska, have invented certain new and useful Improvements in Automobile-Chain-Hook Holders, of which the following is a specification, reference being had to the accompanying drawings.

Anti-skid chains for automobiles are ordinarily connected around the wheel by hooks or fasteners which are very liable to open up and the chain is readily detached from the wheel, particularly in mud, and falls off the wheel unnoticed.

The general object of this invention is to provide a holder or fastening device adapted to be applied upon the hook of the automobile chain to hold the latter closed and prevent any possibility of the hook being accidentally opened.

A further object is to provide a device of this description which embraces the hook and which is held in place by a pintle so arranged that it is practically impossible to remove the pintle except intentionally and by hand.

Another object is to provide a device of this character which is simple in construction, which is readily applied and removed, and which is thoroughly effective for the purpose designed.

My invention is illustrated in the accompanying drawings, wherein:—

Figure 1:
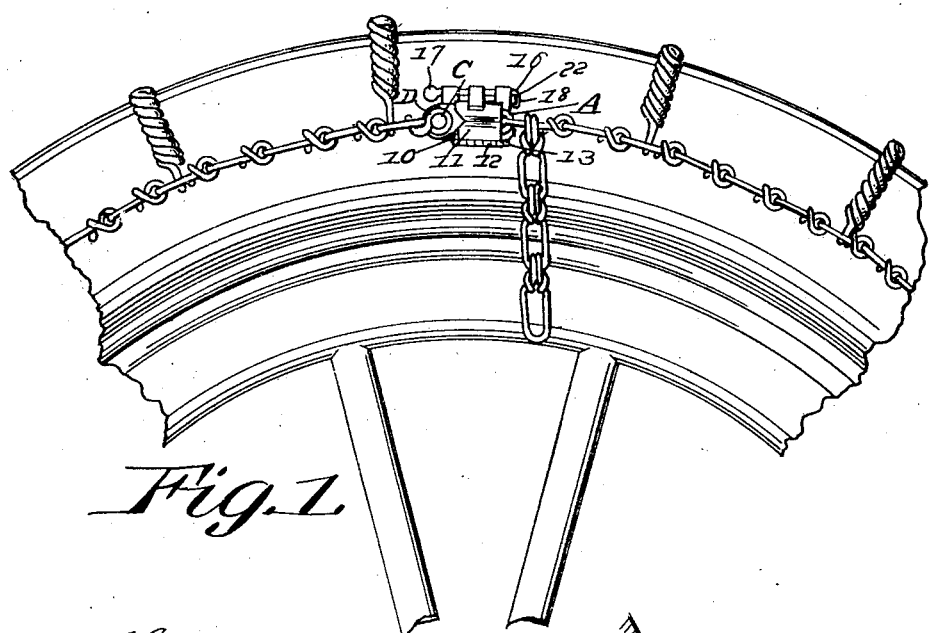
Figure 1 is a side elevation of a portion of an automobile wheel and tire chain with my device applied thereto.
Figure 2:
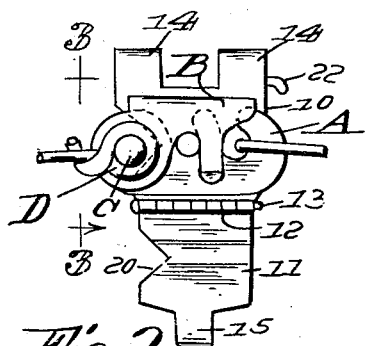
Fig. 2 is a side elevation of the lock of the tire chain with my clasp applied thereto but open.

As illustrated in the accompanying drawings, my device comprises a holder or clasp adapted to embrace the coacting pivoted hooks of an automobile tire chain, this holder being formed in two sections pivoted to each other so that they may be opened to release the hooks or closed to embrace the hooks, and these two sections being formed with coacting eyes and a locking pin insertible through the eyes to hold the sections closed.

In detail my construction comprises two oppositely disposed plates or sections 10 and 11, the section 10 being longer than the section 11, and these sections being hingedly connected to each other by providing coacting hinge beads 12 and a longitudinally extending pintle 13 passing through these beads. The free end of the section 11 is formed intermediate its ends with an eye 15 which is elongated and extends at an inclination to the vertical axis of the holder. The free end of the section 10 is formed with spaced eyes 14 spaced from each other a distance sufficient to receive the eye 15 between them. These eyes are also elongated or elliptical in form and disposed at an angle to the vertical axis of the device, but the eyes 14 are disposed at nearly a right angle to the eye 15, and when the two sections 10 and 11 are closed upon each other, only the extremities of these eyes 14 and 15 register, the lower portions of the eyes 14 being out of register with the lower portion of the eyes 15, as illustrated most clearly in Fig. 3. Coacting with these eyes 14 and 15 is a locking pin 16 which is straight for the greater portion of its length, is formed with a head 17 on one end, and at its opposite end is angularly bent, as at 18, to provide a laterally projecting lug having a length slightly less than the major axis of the elliptical eyes 14 and 15.

Figure 3:
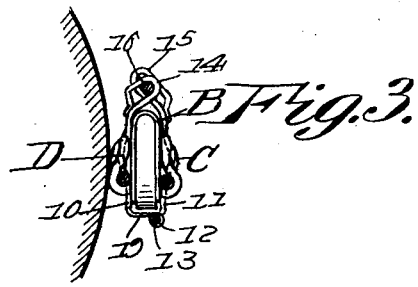
Fig. 3 is a sectional view on the line 3—3 of Fig. 2.
Figure 4:
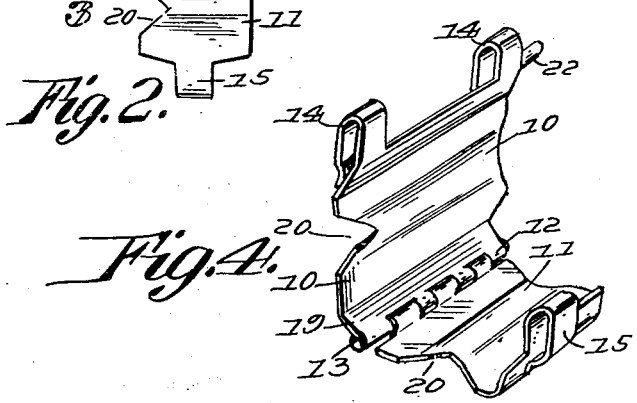
Fig. 4 is a perspective view of the clasp open.
Figure 5:
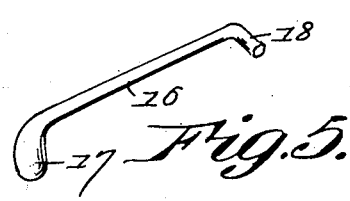
Fig. 5 is a perspective view of the locking pin.

As illustrated in Fig. 3, the hinge connection between the two sections 10 and 11 is not disposed vertically beneath the meeting ends of the two sections when the sections are closed but to one side of the vertical axis cutting these meeting ends. Thus the section 10 is wider than the section 11 so as to form a flat portion 19 forming the bottom of the holder, then the side wall is upwardly and outwardly bent and then extends upward and inward, while the section 10 is upwardly and outwardly extended from its pivotal point and then inwardly extended. Each of the sections 10 and 11 at one end is cut away, as at 20, to receive the head of the pivot bolt of the locking hooks on the chain, and the section 11 at the end opposite this cut away portion 21 is formed with a lug or projection 22.

I have illustrated in Fig. 1 my device as applied to an ordinary form of tire chain having as fastening means therefor the hook-like member A and a coacting member or keeper B which embraces the hook-like member and is pivoted thereto by a transverse pivot bolt C. This is a common form of fastening device for tire chains and it is to prevent this fastening device from opening accidentally that I have devised my holder. The links D of the tire chain are formed with eyes to embrace the opposite heads of the bolt C.

In actual use, this device is placed over the coacting hooks A and B after the latter are closed, as illustrated in Fig. 3. The two sections 10 and 11 are forced together so as to bring the extremities of the eyes 14 and 15 into alinement with each other, and then the locking pin 16 is put in place. This is put in place by turning the pin so as to carry this lug 18 into alinement with the elongated eye 14 opposite the stop lug 22. It is then forced through this elongated eye 14 and is then rotated through an angle of approximately 270° until the lug is in alinement with the elongated eye 15. The pin is then forced through this eye and is again turned through an angle of approximately 270° until the lug is in alinement with the second eye 14 and is then forced through this second eye 14 and is rotated in a reverse direction until it is out of alinement with the second eye 14 and the lug rests against the stop lug 22. The device is then fully locked in position. It will be obvious now that the holder cannot become unlocked unless the locking pin is rotated so as to carry its lug into alinement with the major axis of the adjacent eye 15. Then the pin is withdrawn and rotated to carry the lug 18 into alinement with the major axis of the eye 15 and then withdrawn through this eye. Then and only then can the pin be withdrawn. It requires, therefore, not only shall the pin move longitudinally, but that it shall be rotated each time through an angle of approximately 270° in order to withdraw the pin. Hence the device is locked against any accidental movement. Furthermore, the strain on the two sections is sufficient to cause the eyes to bind fairly tightly upon the pin which will tend to frictionally resist any accidental rotation of the pin.

In using this device it is to be placed around the chain hook, after the other end of the chain has been caught in the hook, with the hinge portion 12 on the lower outer edge of the hook, the wide side or section 10 of the holder facing inward. The relatively narrow section 11 is disposed farthest away from the tire. The chains are placed around the tire and then hooked, then the holder is placed around the chain hook, and then the pin is inserted as above described. It will be obvious that one of these sections, as for instance the section 11, could be permanently attached to the chain hook by the rivet or pintle C which holds the two parts of the chain hook together.

While I have illustrated a particular form of my invention, it will be obvious that many changes might be made in the details of construction and arrangement of parts without departing from the spirit thereof.

I claim:—

1. An automobile chain hook holder comprising two sections operatively hinged to each other and formed to embrace a chain when the sections are closed, and means for detachably locking the free edges of the sections in engagement with each other including a member removable from its locking engagement with the section by combined longitudinal and rotative movement.

2. An automobile chain hook holder comprising two sections operatively hinged to each other and formed to embrace a chain when the sections are closed, means for detachably locking the free edges of the sections in engagement with each other and including coacting elongated eyes on the free edges of the two sections, the longer axis of an eye on one section extending at an angle to the longer axis of a coacting eye on the other section whereby said sections may be disposed in alinement with each other but not in register, and a locking pin passing through said eyes and having a radially projecting lug requiring to be brought into alinement with each elongated eye successively in order that it may pass through the several eyes and be withdrawn and inserted.

3. An automobile chain hook holder comprising two sections operatively hinged to each other and formed to embrace a chain when the sections are closed, means for detachably locking the free edges of the sections in engagement with each other and including coacting elongated eyes on the two sections, the extremities only of the eyes being adapted to register with each other, and a locking pin passing through said eyes, the locking pin being provided with a radially projecting lug at one extremity requiring to be brought into alinement with each elongated eye in order that it may pass through the eyes and be withdrawn or inserted.

4. An automobile chain hook holder comprising two sections operatively hinged to each other and formed to embrace a chain when the sections are closed, means for detachably locking the free edges of the sections in engagement with each other and including coacting elongated eyes on the two sections, the extremities only of the eyes being adapted to register with each other, and a locking pin passing through said eyes, the locking pin being provided with a radially projecting lug at one extremity requiring to be brought into alinement with each elongated eye in order that it may pass through the eyes and be withdrawn or inserted, one of said sections being provided with a stop lug against which the lug on the pin strikes when the pin has been fully inserted and the lug turned out of alinement with the adjacent eye.

5. An automobile chain hook holder comprising two sections hinged to each other, the sections being outwardly bent and thereby adapted to embrace a chain hook, the free ends of the sections being formed with elongated eyes, the eyes on one section being disposed in staggered relation to the eye on the other section, the eye on one section extending at an angle to the eyes on the other section whereby the extremities of said eyes may be brought into alinement with each other when the holder is clasped upon a hook, and a locking pin insertible through said eyes, said locking pin having a head on one end and at its opposite end being formed with a radially projecting lug having a length approximately that of the eyes, one end of one of the sections being provided with a stop lug with which said lug on the pin is adapted to engage when the pin is fully inserted and rotated.

6. An automobile chain hook holder comprising two lateral sections, both of said sections being outwardly bent so that the sections describe an approximate ellipse when closed, one of said sections being less in width than the other, the last named section having a flat portion intersecting the major axis of said ellipse and the sections being hinged to each other along the edge of this flat portion, the free edges of the sections being formed with coacting elongated eyes, the eyes of one section being disposed at an angle to the eyes of the other section and the extremities only of said eyes registering when the sections are closed, and a locking pin insertible through said eyes and having a head on one end, and a radially projecting lug on the other end having a length approximately the same as the length of the eyes.

7. An automobile chain hook holder comprising two lateral sections, both of said sections being outwardly bent so that the sections describe an approximate ellipse when closed, one of said sections being less in length than the other and less in width than the other section, the last named section having a flat portion intersecting the major axis of said ellipse and the sections being hinged to each other along the edge of this flat portion, the free edges of the sections being formed with coacting elongated eyes, the eyes of one section being disposed at an angle to the eyes of the other section and the extremities only of said eyes registering when the sections are closed, a locking pin insertible through said eyes and having a head on one end, and a radially projecting lug on the other end having a length approximately the same as the length of the eyes.

In testimony whereof I hereunto affix my signature.

PAUL V. OHLHEISER.